(12) United States Patent
Takeda et al.

(10) Patent No.: US 8,192,029 B2
(45) Date of Patent: Jun. 5, 2012

(54) IMAGE DISPLAY DEVICE

(75) Inventors: Takashi Takeda, Suwa (JP); Daisuke Uchikawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1212 days.

(21) Appl. No.: 11/892,794

(22) Filed: Aug. 27, 2007

(65) Prior Publication Data

US 2008/0055556 A1 Mar. 6, 2008

(30) Foreign Application Priority Data

Sep. 4, 2006 (JP) ................................. 2006-239437

(51) Int. Cl.
*G03B 21/00* (2006.01)
(52) U.S. Cl. ......................................... 353/21; 359/196
(58) Field of Classification Search .................... 353/21, 353/94; 345/204; 359/196.1–207.1; 349/14; 372/43
See application file for complete search history.

(56) References Cited

U.S. PATENT DOCUMENTS

| | | | |
|---|---|---|---|
| 5,502,490 A | 3/1996 | Takanashi et al. | |
| 6,220,714 B1 | 4/2001 | Eguchi | |
| 6,402,322 B1 | 6/2002 | Aoki | |
| 6,511,186 B1 * | 1/2003 | Burstyn et al. | 353/76 |
| 6,947,459 B2 * | 9/2005 | Kurtz et al. | 372/43.01 |
| 7,088,353 B2 * | 8/2006 | Fujii et al. | 345/204 |
| 7,185,991 B2 * | 3/2007 | Akiyama | 353/102 |
| 7,193,666 B2 * | 3/2007 | Choi et al. | 349/74 |
| 2004/0212867 A1 * | 10/2004 | Self et al. | 359/245 |

FOREIGN PATENT DOCUMENTS

| | | |
|---|---|---|
| CN | 1244277 A | 2/2000 |
| JP | A-04-025290 | 1/1992 |
| JP | A-05-093896 | 4/1993 |
| JP | A-10-319873 | 12/1998 |
| JP | A-11-174320 | 7/1999 |
| JP | A-2000-091231 | 3/2000 |
| JP | A-2000-098191 | 4/2000 |
| JP | A 2000-131762 | 5/2000 |
| JP | A-2002-072360 | 3/2002 |
| JP | A-2002-202414 | 7/2002 |
| JP | A-2003-191529 | 7/2003 |
| JP | A-2003-222727 | 8/2003 |
| JP | A-2003-232968 | 8/2003 |
| JP | A-2004-094215 | 3/2004 |
| JP | A-2004-146456 | 5/2004 |
| JP | A-2004-264776 | 9/2004 |
| KR | 2001-0015285 A | 2/2001 |
| WO | WO 2006/055133 A1 | 5/2006 |

\* cited by examiner

*Primary Examiner* — Que T Le
*Assistant Examiner* — Jerry Brooks
(74) *Attorney, Agent, or Firm* — Oliff & Berridge, PLC (57) ABSTRACT

An image display device includes: a laser light source having a plurality of emitting sections arrayed in a predetermined direction; and a light modulation device that includes an illumination region extending in a longitudinal direction and a lateral direction, and that modulates the laser lights emitted from the laser light source in accordance with an image signal. In the image display device, the predetermined direction in which the emitting sections are arrayed coincides with the longitudinal direction of the illumination region of the light modulation device.

6 Claims, 9 Drawing Sheets

IMAGE DISPLAY DEVICE

CROSS-REFERENCE TO RELATED APPLICATION

This application claims priority from Japanese Patent Application No. 2006-239437, filed on Sep. 4, 2006, the contents of which are incorporated herein by reference.

BACKGROUND

1. Technical Field

The present invention relates to an image display device.

2. Related Art

In projection type image display device in recent years, a discharge lamp (e.g., extra-high pressure mercury lamp) is generally used as a light source.

However, in such a discharge lamp, there is a problem in that the lifetime of the discharge lamp is comparatively short, in that quick illumination is difficult, the scope of color reproducibility is narrow, and UV-light radiated from the discharge lamp causes degradation of a liquid crystal light valve, or the like.

As disclosed by Japanese Unexamined Patent Application, First Publication No. 2000-131762, a projection type image display device that includes a laser light source emitting a monochromatic light, has been proposed instead of the discharge lamp.

In this projection type image display device disclosed by the patent document, laser lights emitted from the laser light source are converted into parallel light by a convex lens, and the intensity distribution of the parallel light is uniformed.

The uniformed laser lights are incident onto a liquid crystal light valve, the intensity of the laser lights are modulated by the liquid crystal light valve, and the laser lights are subsequently projected on a screen through a convex lens arranged at a posterior in the image display device.

In the case in which the output power of the laser light source is not sufficient, the number of the laser beams can be increased (multi-beams) in order to solve the problem.

In a structure in which the number of the laser beam increases, a plurality of normal single emitter type laser light sources arranged side by side is used, or an arrayed multi-emitter type laser light source is used.

However, in the projection type image display device disclosed in the above described patent document, when the light source that emits the laser lights is used, the laser lights emitted from the light source are incident into the liquid crystal light valve (light modulation device) at a great angle with respect to the surface of the liquid crystal light valve, depending on the arrangement of the laser light sources.

If the incidence angle becomes greater, decreasing the F-number of the projection lens arranged at the posterior in the image display device is necessary. In this case, the cost of the projection lens increases.

Furthermore, if the incidence angle at which the laser lights which are incident into the liquid crystal light valve becomes greater, there is a problem in that the contrast of the image displayed onto the screen decreases.

Furthermore, when the laser lights are condensed into the liquid crystal light valve using a hologram element, the efficiency of illumination decreases due to an increase in diffraction loss, if a diffraction angle increases in the hologram element.

SUMMARY

An advantage of an aspect of the invention is to provide an image display device in which an increase in cost is prevented, the laser lights are efficiently and uniformly illuminated onto the light modulation device, and it is possible to improve the contrast of the image.

An aspect of the invention provides an image display device including: a laser light source having a plurality of emitting sections arrayed in a predetermined direction; and a light modulation device that includes an illumination region extending in a longitudinal direction and a lateral direction, and that modulates the laser lights emitted from the laser light source in accordance with an image signal. In the image display device, the predetermined direction in which the emitting sections are arrayed coincides with the longitudinal direction of the illumination region of the light modulation device.

According to the image display device of the aspect of the invention, the laser lights emitted from the laser light source are incident into the light modulation device at an incidence angle. In the light modulation device, an image is modulated in accordance with an image signal. The image is projected onto the projection surface. In the invention, the predetermined direction in which the emitting sections are arrayed coincides with the longitudinal direction of the illumination region of the light modulation device. In this structure, it is possible to make the incidence angle small, as compared with the case in which the arrangement of the laser lights is not considered as in the related art.

Therefore, the laser lights can be efficiently and uniformly illuminated onto the light modulation device. Thus, it is possible to improve the contrast of the image projected onto the projection surface.

Furthermore, in the case in which a projection lens is arranged at the posterior of the light modulation device, since the incidence angle at which the laser lights are incident to the light modulation device is made small as described above, decreasing the F-number of the projection lens is unnecessary. Thus, increase in cost can be prevented.

It is preferable that, in the image display device of the aspect of the invention, the emitting sections be arrayed in a first direction and in a second direction intersecting the first direction, the distance between both ends of the emitting sections arranged in the first direction be greater than the distance between both ends of the emitting sections arranged in the second direction, and the first direction in which the emitting sections are arrayed coincide with the longitudinal direction of the illumination region of the light modulation device.

In the image display device of the aspect of the invention, the emitting sections are arrayed in the first direction and in the second direction intersecting the first direction. Thus, the emitting sections are two-dimensionally arrayed. In the two-dimensional arrangement of the emitting sections, the distance between both ends of the emitting sections arranged in the first direction is greater than the distance between both ends of the emitting sections arranged in the second direction. Furthermore, the first direction in which the emitting sections are arrayed coincides with the longitudinal direction of the illumination region of the light modulation device.

Accordingly, in the case of two-dimensional arrangement of the emitting sections, it is possible to obtain the effect as described above.

It is preferable that, in the image display device of the aspect of the invention, the laser light source be a laser array in which a plurality of emitting elements including the emitting section are individually formed.

According to the image display device of the aspect of the invention, the emitting elements each of which has the emitting section are individually formed in the laser array. In a process prior to the process of packaging the emitting elements to the laser array, it is possible to separate an irregular element.

Thus, it is possible to form the laser array in which the characteristics of the emitting elements are uniformed. Also, it is possible to uniformly emit the laser lights (e.g., a dispersion of light intensity is prevented in the laser lights) from the laser array.

Accordingly, since the uniformed laser lights can be illuminated onto the light modulation device, it is possible to improve the contrast of the image projected onto the projection surface.

It is preferable that, in the image display device of the aspect of the invention, the laser light source be a laser bar in which the emitting sections are unidirectionally arrayed.

According to the image display device of the aspect of the invention, since the laser light source is a laser bar, the distance between the emitting sections can be made small.

Thus, it is unnecessary to make the laser light source large, and it is possible to raise the intensity of the laser lights emitted from the light source. It is possible to realize the miniaturized laser light source having high power output.

Furthermore, since an arrangement precision between the emitting sections is regulated by a photo-mask used in the process of manufacturing the laser bar, the emitting sections can be unidirectionally arrayed with precision.

Thus, it is possible to uniform the emitting directions of the laser lights emitted from the emitting sections. It is possible to illuminate the identical region of the light modulation device.

Accordingly, since the laser lights can be illuminated onto the light modulation device with precision, it is possible to improve the contrast of the image projected onto the projection surface.

It is preferable that, in the image display device of the aspect of the invention, the laser light source be a vertical cavity surface emitting laser array in which the emitting sections are two-dimensionally arrayed.

According to the image display device of the aspect of the invention, since the laser light source is the vertical cavity surface emitting laser array, the emitting sections can be collectively formed (integrated) on the identical substrate.

Thereby, since the emitting sections can emit the coherent light in parallel and in a vertical direction with respect to a wafer, it is easy to array the emitting sections as a two-dimensional arrangement.

Furthermore, since an arrangement precision between the emitting sections is regulated by a photo-mask used in a process of manufacturing the vertical cavity surface emitting laser, the emitting sections can be arrayed on a predetermined position with precision.

Thus, it is possible to uniform the emitting directions of the laser lights emitted from the emitting sections. It is possible to illuminate the identical region of the light modulation device.

Accordingly, by the simple structure, it is possible to improve the contrast of the image projected onto the projection surface.

It is preferable that the image display device of the aspect of the invention further include an optical element converting the laser lights emitted from the laser light source and illuminated on the light modulation device, into linear laser light.

According to the image display device of the aspect of the invention, the laser lights which are incident into the light modulation device is converted by the optical element into the linear laser light, and emitted from the optical element.

In this structure, it is possible to make the incidence angle small, the laser lights being incident into the light modulation device at the incidence angle, as compared with the case in which, for example, a surface emitting laser is illuminated onto the light modulation device.

Accordingly, it is possible to further improve the contrast of the image projected onto the projection surface.

It is preferable that the image display device of the aspect of the invention further include a scanning section disposed between the light modulation device and a projection surface, scanning the linear laser light emitted from the light modulation device onto the projection surface. In the image display device, the light modulation device is a one-dimensional light modulation device in which a plurality of light modulation pixels is one-dimensionally arrayed.

According to the image display device of the aspect of the invention, the laser lights emitted from the light source are converted into the linear laser light by the optical element, and sequentially modulated in the one-dimensional light modulation device.

The scanning section scans the modulated laser light onto the projection surface.

Thus, since the light modulation device is the one-dimensional light modulation device, the laser lights have emitted from the light source are easily and uniformly illuminated onto the one-dimensional light modulation device.

Accordingly, since the uniformed laser light is emitted from the one-dimensional light modulation device, it is possible to project the high contrast image onto the projection surface without uneven luminance.

It is preferable that, in the image display device of the aspect of the invention, the laser light source include a plurality of emitting arrays that have the emitting sections arrayed in the predetermined direction and that are arranged in a direction orthogonal to the predetermined direction, the optical element convert the laser lights emitted from the laser light source into linear laser light, the number of the linear laser lights be less than or equal to the number of the emitting arrays, and the optical element condense the linear laser lights into a portion other than a portion through which the optical path of the zero-dimensional light of the laser lights emitted from the emitting arrays passes.

According to the image display device of the aspect of the invention, the laser lights emitted from the emitting sections and from the each of the emitting arrays are converted into the linear laser light. In this case, the number of the linear laser lights is less than or equal to the number of the emitting arrays. The optical element condenses the linear laser lights into a portion other than the portion through which the optical path of the zero-dimensional light of the laser lights emitted from the emitting arrays passes.

Accordingly, since the zero-dimensional light affecting images displayed on a screen is not illuminated onto the light modulation device, it is possible to clearly project the images onto the projection surface.

It is preferable that the semiconductor device of the aspect of the invention further include a scanning section disposed between the optical element and the light modulation device, scanning the linear laser light emitted from the optical element onto the light modulation device. In the image display device, the light modulation device is a two-dimensional light modulation device in which a plurality of light modulation pixels is two-dimensionally arrayed.

According to the image display device of the aspect of the invention, the laser lights have emitted from the laser light source are modulated into the linear laser light by the optical element, sequentially incident to the scanning section.

The linear laser light that has been incident to the scanning section is scanned onto the two-dimensional light modulation device.

The linear laser light that has modulated in the two-dimensional light modulation device is projected onto the projection surface.

Thus, since the uniformed linear laser light is illuminated onto the two-dimensional light modulation device, it is possible to project a high contrast image onto the projection surface without uneven luminance.

Furthermore, in the two-dimensional light modulation device, since image data is written into the light modulation pixels by a one pass scan method, the linear laser light can be illuminated onto an area on which the image data has been determined.

Accordingly, it is possible to provide an image display device having excellent motion image characteristics.

It is preferable that, in the image display device of the aspect of the invention, the laser light source include a plurality of emitting arrays that have the emitting sections arrayed in the predetermined direction and that are arranged in a direction orthogonal to the predetermined direction, the optical element convert the laser lights emitted from the laser light source into the linear laser light, and the number of the linear laser lights be equal to the number of the emitting arrays.

According to the image display device of the aspect of the invention, in the case in which the light source includes the emitting arrays, the optical element converts the laser lights emitted from the light source into the linear laser light. In this case, the number of the linear laser lights is equal to the number of the emitting arrays.

Each of the linear laser lights are illuminated onto the light modulation device. Accordingly, it is possible to make the incidence angle of each of the linear laser lights small.

It is preferable that the semiconductor device of the aspect of the invention further include a phase difference plate disposed between the laser light source and the light modulation device, and that the light modulation device be a liquid crystal element.

In the case in which a polarization direction of the laser lights emitted from the light source does not coincide with a polarization direction of a polarization plate arranged at an incidence-side of a liquid crystal element, the image display device of the aspect of the invention is desirably applied.

In the image display device, a plane of polarization of the laser lights emitted from the light source rotate due to the phase difference plate. Thereby, the laser lights can coincide with the polarization direction of the polarization plate arranged at the incidence-side of the liquid crystal element.

Accordingly, since it is possible to improve the light using efficiency, it is possible to obtain brighter images.

DESCRIPTION OF EXEMPLARY EMBODIMENTS

Hereinafter, image display devices according to embodiments of the invention will be described with reference to the accompanying drawings.

In addition, scales of individual members in the drawings to be referred below are appropriately changed so that each member has a recognizable size.

First Embodiment

An image display device of a first embodiment of the invention is explained, referring to FIGS. 1 to 3B.

Figure 1:
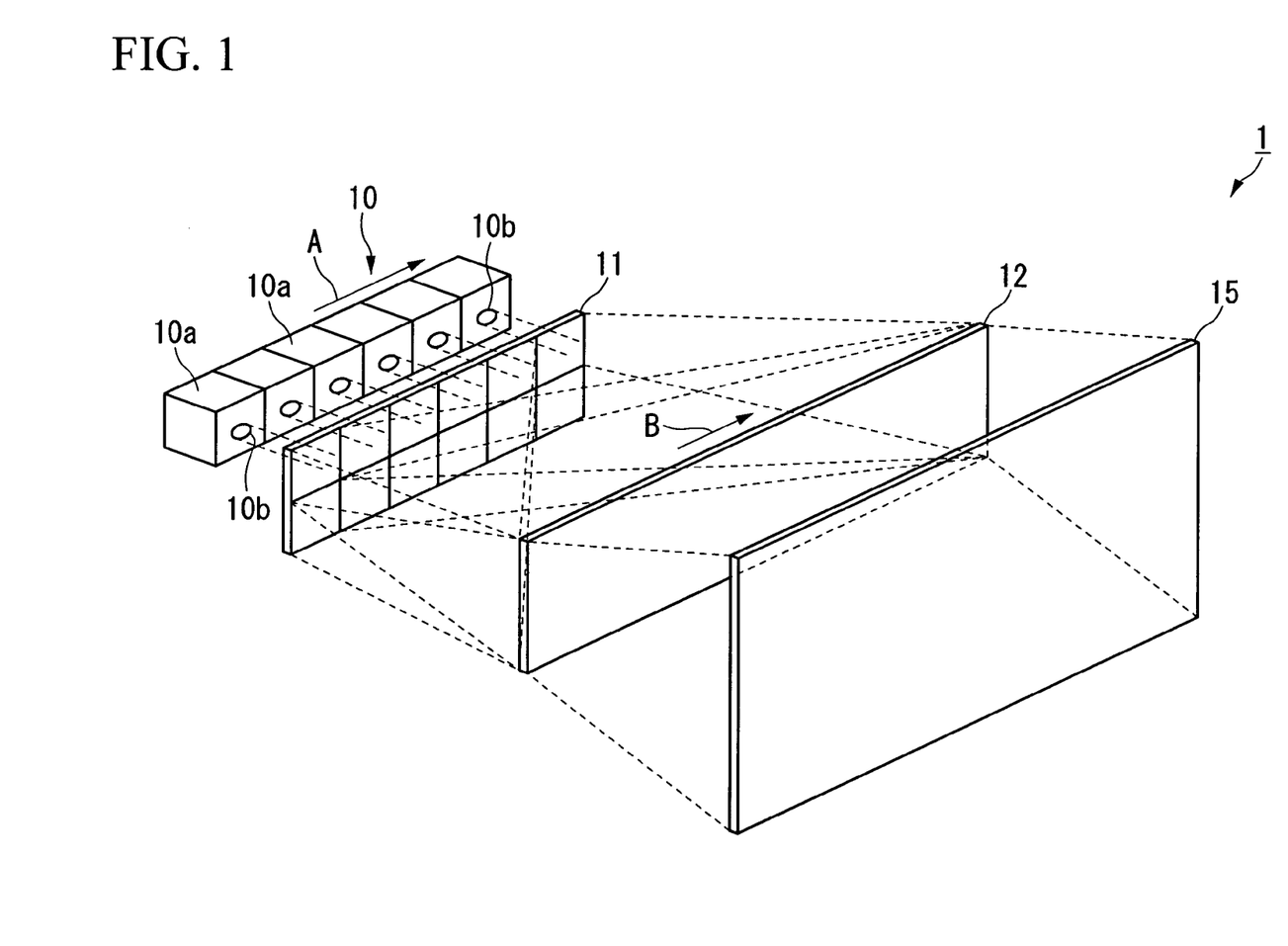
FIG. 1 is a perspective view of an image display device according to a first embodiment of the invention.

As shown in FIG. 1, an image display device 1 of the first embodiment includes a laser light source 10, a micro lens array 11, and a light valve (light modulation device) 12.

The laser light source 10 emits a plurality of laser lights.

The micro lens array 11 uniforms the brightness distribution of the laser lights emitted from the laser light source 10.

The laser lights made uniform by the micro lens array 11 are incident into the light valve 12. The light valve 12 modulates the laser lights emitted from the laser light source 10 in accordance with an image signal.

The laser lights modulated by the light valve 12 are projected onto a screen (projection surface) 15 through a projection lens (not shown).

Figure 2A:
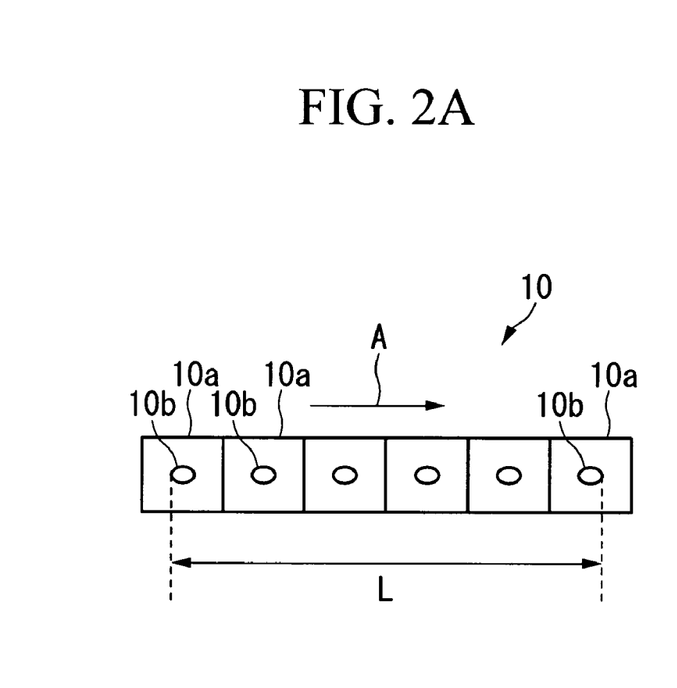
FIG. 2A is a plan view of a laser light source of the image display device of FIG. 1.
Figure 2B:
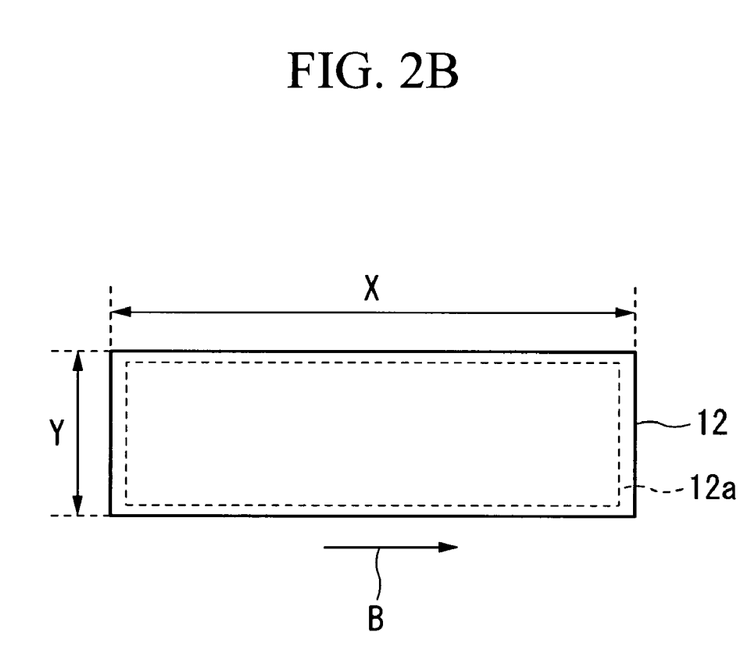
FIG. 2B is a plan view of a light modulation device of the image display device of FIG. 1.

The laser lights made uniform by the micro lens array 11 are illuminated onto the entire illumination region (pixel region) 12a as shown in FIG. 2B. The illumination region 12 extends in a longitudinal direction and a lateral direction.

As shown in FIG. 2A, the laser light source 10 is a semiconductor laser array in which a plurality of semiconductor laser elements (emitting elements) 10a is arrayed in one direction (in a predetermined direction) indicated as reference numeral A. The semiconductor laser elements 10a include emitting sections 10b, respectively. The number of the semiconductor laser elements 10a is 6 in the first embodiment. In the semiconductor laser array, the semiconductor laser elements 10a are individually formed.

In the semiconductor laser elements 10a arrayed in the array direction A, the distance between the semiconductor laser elements 10a arranged at both ends is indicated as reference numeral L.

Specifically, in the first embodiment, a direction passing through both ends at which the semiconductor laser elements 10a arranged coincides with the array direction A.

The laser lights emitted from the semiconductor laser elements 10a are visible light.

The micro lens array 11 includes two arrays that are arranged in a direction orthogonal to the array direction A of the semiconductor laser elements 10a.

In this structure, the laser light emitted from the semiconductor laser elements 10a are overlapped, and sequentially illuminated onto the light valve 12.

As shown in FIG. 2B, the light valve 12 is shaped in a rectangular form, the size of the light valve 12 in the horizontal direction (X direction) being greater than that in the orthogonal direction (Y direction).

Specifically, in the light valve 12, an aspect ratio (width X:height Y) is, for example, 4:3, or 16:9.

Furthermore, the direction indicated by arrow B in FIG. 2B is the longitudinal direction of the illumination region 12a of the light valve 12.

As shown in FIG. 1, the laser light source 10 is arranged so that the longitudinal direction B of the illumination region 12a of the light valve 12 coincides with the array direction A of the laser light source 10.

In the image display device 1 of the first embodiment, the laser light source 10 is disposed so that the array direction A of the laser light source 10 coincides with the longitudinal direction B of the illumination region 12a of the light valve 12.

Therefore, it is possible to make the incidence angle small. Accordingly, the laser lights emitted from the laser light source 10 are incident to the light valve 12 at the incidence angle are made small.

Next, the first embodiment of the invention is described below in detail together with a comparative example.

Figure 3A:
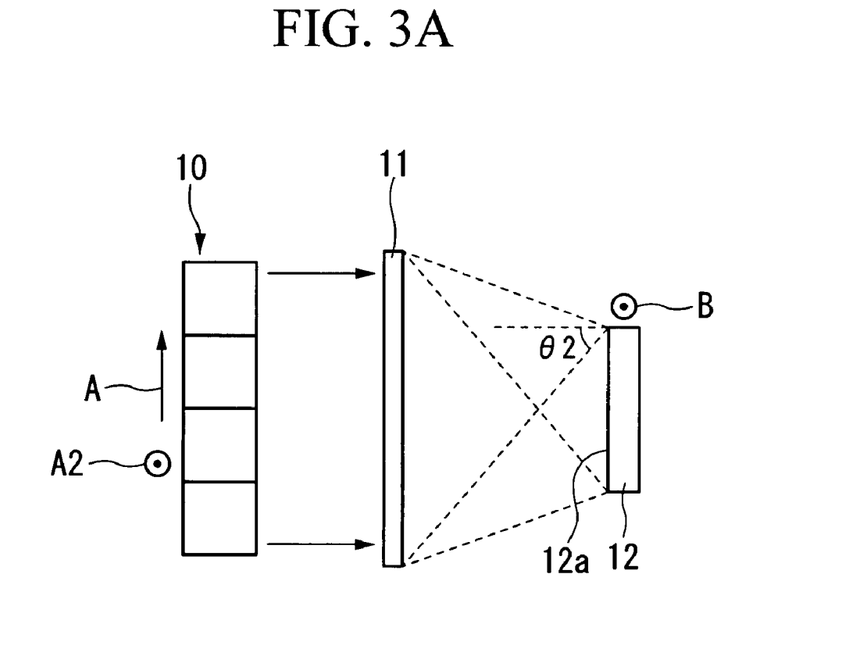
FIGS. 3A and 3B are views for explaining an incidence angle at which the laser lights are incident into a light modulation device.

In an image display device of the comparative example, for example, as shown in FIG. 3A, the array direction A of the laser light source 10 is orthogonal to the longitudinal direction B of the illumination region 12a of the light valve 12. In other words, a lateral direction A2 of the laser light source 10 coincides with the longitudinal direction B of the illumination region 12a of the light valve 12. In this case, an incidence angle of the laser lights with respect to an incidence surface 12c is indicated as reference numeral θ2.

In this comparative example, in the case in which a liquid crystal light valve is used as the light valve 12, the incidence angle at which the laser lights are incident into the light valve 12 is great, depending on the arrangement of the laser light sources. There is a problem in that the contrast of the images decreases.

Figure 3B:
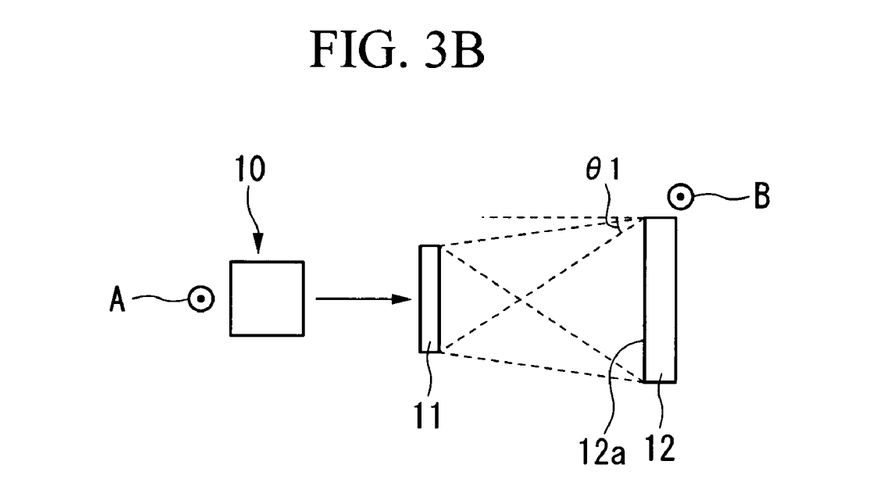

In contrast, in the image display device 1 of the first embodiment as shown in FIG. 3B, the array direction A of the laser light source 10 coincides with the longitudinal direction B of the illumination region 12a of the light valve 12. In this case, an incidence angle of the laser lights with respect to an incidence surface 12c is indicated as reference numeral θ1.

In the first embodiment, since it is unnecessary for the micro lens array 11 to bend the laser lights at a great angle, the incidence angle θ1 of the first embodiment is smaller than the incidence angle θ2 of the comparative example.

Thus, in the image display device 1 of the first embodiment, it is possible to improve the contrast of the images, and solve the above described problem.

Furthermore, in the image display device 1 of the invention, since the incidence angle θ1 with respect to the light valve 12 can be made small, it is possible to improve the light using efficiency of the laser light.

Therefore, to obtain a bright optical system, it is unnecessary to decrease the F-number of the projection lens, and it is unnecessary to use an expensive projection lens.

Specifically, it is possible to clearly project the images onto the screen 15 while maintaining a low cost.

Accordingly, in the image display device 1 of the first embodiment, the laser light is efficiently and uniformly illuminated onto the light valve 12, and it is possible to improve the contrast of the images.

Modified Example of the First Embodiment

In the first embodiment as shown in FIG. 1, the micro lens array 11 is used as a structure that make the laser lights emitted from the laser light source 10 uniform. A hologram element may be used instead of the micro lens array 11.

As a hologram element of the image display device of the modified example of the first embodiment, for example, a computer generated hologram (CGH) formed with interference fringes, which are artificially created on a hologram plate may be used on the basis of calculation using a calculator.

The computer generated hologram is suitable because a divided region of a diffraction grating can be freely set, and accordingly, aberration does not occur.

In the case of using the hologram element, laser lights emitted from the hologram element are illuminated onto the entire light valve like the first embodiment.

In the image display device of the modified example of the first embodiment, since the laser lights illuminated onto the light valve desirably have the parallelity, it is possible to clearly project the images onto the screen with high contrast.

Second Embodiment

Figure 4:
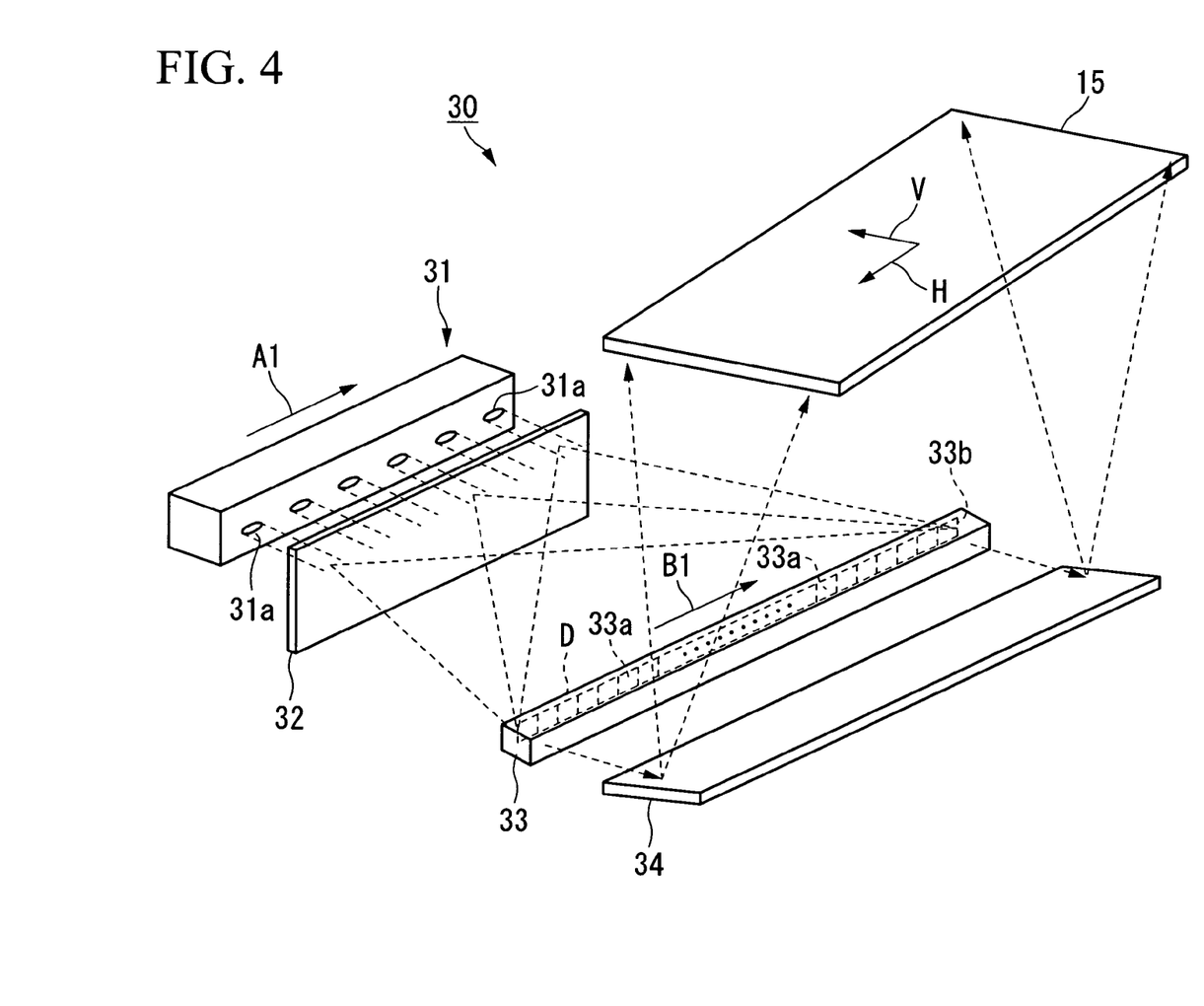
FIG. 4 is a perspective view of an image display device according to a second embodiment of the invention.

Next, an image display device of a second embodiment of the invention is explained, referring to FIG. 4.

In addition, in each embodiment to be described below, parts common to those of the image display device according to the first embodiment described above are denoted by the same reference numerals, and the descriptions thereof will be omitted.

In the first embodiment described above, the laser lights emitted from the micro lens array 11 are illuminated onto the entire illumination region 12a of the light valve 12. In contrast, in the image display device 30 of the second embodiment, a linear laser beam is illuminated onto a one-dimensional light valve 33.

As shown in FIG. 4, the image display device 30 includes a laser light source 31 emitting a plurality of laser lights, a hologram element (optical element) 32, a one-dimensional light valve 33, and a scanning mirror (scanning section) 34.

The laser light source 31 is a semiconductor laser bar in which a plurality of emitting sections 31a is one-directionally arrayed.

In the laser light source 31, the emitting sections 31a are arrayed in direction A1.

Specifically, in the second embodiment, a direction passing to both ends, at which the emitting sections 31a arranged, coincides with the array direction A1.

Furthermore, the laser light source 31 is arranged so that the array direction A1 of the emitting sections 31a of the laser light source 31 coincides with the longitudinal direction B1 of the illumination region 33b of the one-dimensional light valve 33, like the first embodiment.

The hologram element 32 is an optical element that converts the laser light emitted from the laser light source 31 into a linear laser light D along the longitudinal direction A1 of the emitting sections 31a of the laser light source 31.

Also, the hologram element 32 is the computer generated hologram (CGH) as described in the modified example of the first embodiment.

Furthermore, the one-dimensional light valve 33 is a transmissive liquid crystal element. In the one-dimensional light valve 33, the light modulation pixels 33a are one-dimensional light modulation devices that are each one-dimensionally arrayed.

Here, the width of the laser light D (the width in the direction which is vertical to the array direction Al of the emitting sections 31a) is substantially equal to the width of the light modulation pixel 33a (the width in a direction which is vertical to the longitudinal direction B1 of the one-dimensional light valve 33).

The scanning mirror 34 is disposed between the one-dimensional light valve 33 and the screen 15.

The scanning mirror 34 scans the laser light modulated by the one-dimensional light valve 33 onto the screen 15.

Thus, the laser lights emitted from the one-dimensional light valve 33 are reflected by the scanning mirror 34, and sequentially projected onto the screen 15 at the horizontal direction indicated by arrow H.

The scanning mirror 34 scans the laser lights projected at the horizontal direction onto the screen 15 at the orthogonal direction indicated by arrow V.

In the image display device 30 of the second embodiment, it is possible to obtain the same effects as the image display device 1 of the first embodiment.

Furthermore, in the image display device 30 of the second embodiment, since the hologram element 32 converts the laser lights that will be incident to the one-dimensional light valve 33 into the linear laser light, it is possible to make the incidence angle small. At the incidence angle, the linear laser lights are incident to the one-dimensional light valve 33.

Accordingly, it is possible to further improve the contrast of the images projected onto the screen 15.

Furthermore, since the one-dimensional light valve 33 is the one-dimensional light modulation device, the laser lights emitted from the laser light source 31 are easily and uniformly illuminated onto the one-dimensional light valve 33.

Specifically, since the uniform laser light is emitted from the one-dimensional light valve 33, it is possible to project the high contrast images onto the screen 15 without uneven luminance.

In the second embodiment, the transmissive liquid crystal element is used as the one-dimensional light modulation device. As the one-dimensional light modulation device, a reflective liquid crystal element, GLV (Grating Light Valve), or the like, may be used.

Third Embodiment

Figure 5:
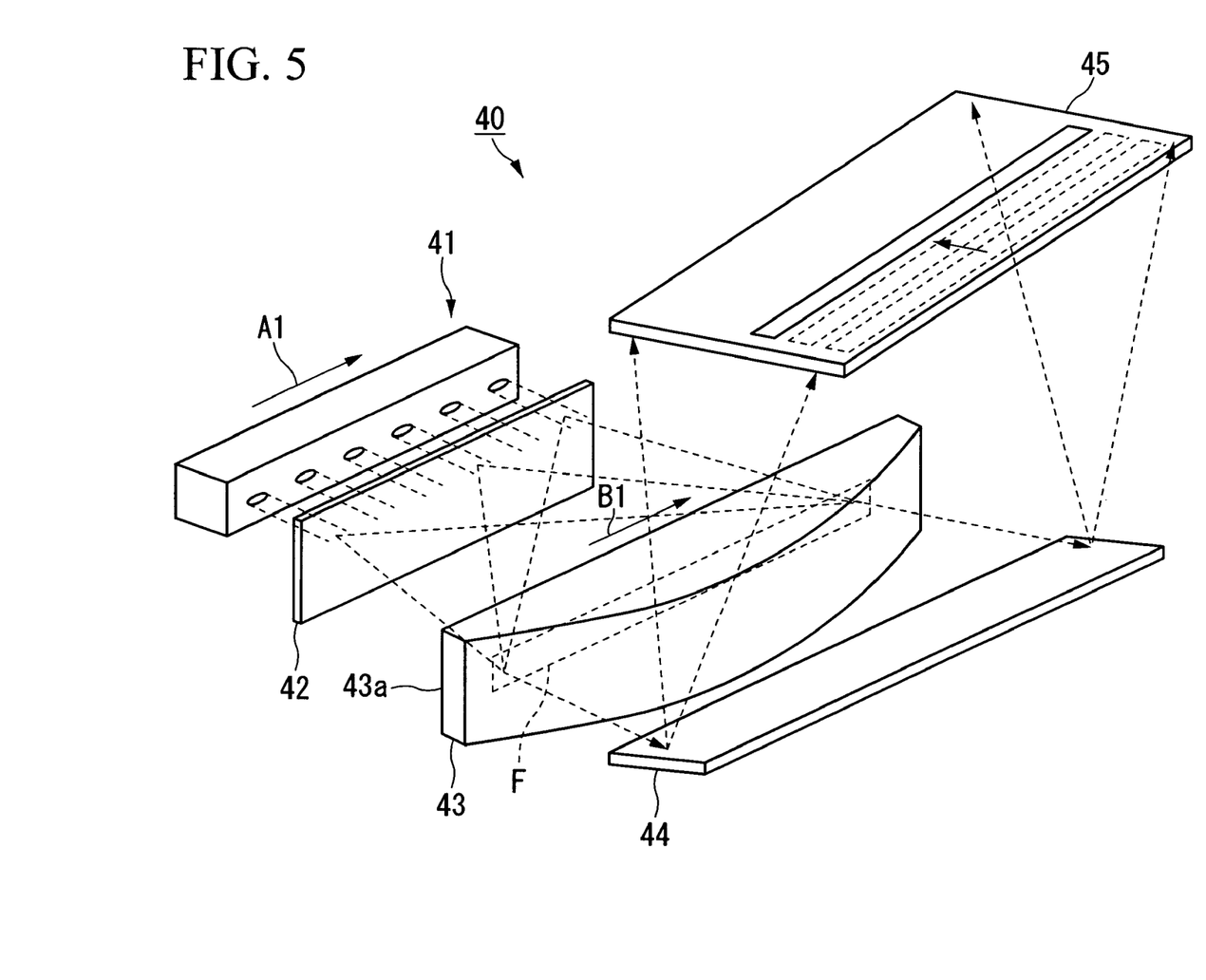
FIG. 5 is a perspective view of an image display device according to a third embodiment of the invention.
Figure 6:
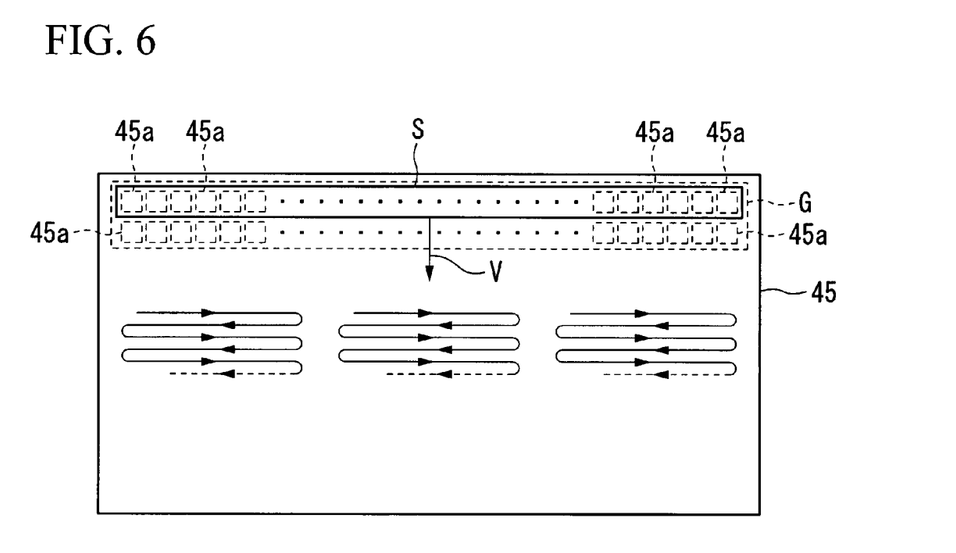
FIG. 6 is a plan view of a light modulation device of the image display device of FIG. 5.

Next, an image display device of a third embodiment of the invention is explained, referring to FIGS. 5 and 6.

The image display device 40 of the third embodiment is different from the second embodiment in that the linear laser beam is illuminated onto a two-dimensional light valve 45.

As shown in FIG. 5, the image display device 40 includes the laser light source 41 which is the same as the first embodiment, a hologram element (optical element) 42, a cylindrical lens 43, a scanning mirror (scanning section) 44, and the two-dimensional light valve (light modulation device) 45.

The hologram element 42 is an optical element that converts the laser lights emitted from the laser light source 41 into a linear laser light F, and that makes the linear laser light F incident to the incidence surface 43a of the cylindrical lens 43.

The hologram element 42 is a computer generated hologram (CGH) as described in the modified example of the first embodiment.

The cylindrical lens 43 converts the incident linear laser light into parallel light.

The scanning mirror 44 scans the parallel linear laser light converted by the cylindrical lens 43 into the two-dimensional light valve 45.

As shown in FIG. 6, the two-dimensional light valve 45 is a two-dimensional light modulation device in which the light modulation pixels 45a are two-dimensionally arrayed.

The two-dimensional light valve 45 includes three areas.

In the two-dimensional light valve 45, pixel data is written or overwriten by one pass scan method at the light modulation pixels 45a of each of the areas.

The linear laser light S is illuminated onto the area at which the pixel data is a desired value. Thus, as shown in FIG. 6, the area is the area G at which the pixel data of the two-dimensional light valve 45 is determined. The linear laser light S is illuminated onto the area G, and moved in the direction indicated as reference numeral V.

The area G, at which the pixel data is determined, means an area at which a transmissivity of the light modulation pixels 45a has reached the predetermined transmissivity by detecting through polarization plates.

In the case of the liquid crystal light valve, there is a time deference between the time at which a predetermined voltage is supplied to the light modulation pixel 45a and the time at which a transmissivity of the light modulation pixel 45a reaches to a predetermined value.

In other words, the time at which the transmissivity of the light modulation pixel 45a reaches the predetermined value is delayed as compared with the time at which the predetermined voltage has supplied to the light modulation pixel 45a. Therefore, if the linear laser light S is illuminated onto the light modulation pixels 45a at the time when the predetermined voltage is supplied thereto, there is concern that the linear laser light S is transmitted through the light modulation pixels 45a while the transmissivity has not reached the predetermined value.

In contrast, in the third embodiment, by illuminating the area at which the transmissivity has reached to the predetermined value, it is possible to obtain the predetermined intensity of light.

In the image display device 40 of the third embodiment, it is possible to obtain the same effects as the image display device 30 of the second embodiment.

Furthermore, in the image display device 40 of the third embodiment, since the uniform laser light is illuminated onto the two-dimensional light valve 45, it is possible to project the high contrast image onto the screen 15 without uneven luminance.

Furthermore, in the image display device 40 of the invention, it is possible to illuminate the linear laser light S onto the area G at which the pixel data of the two-dimensional light valve 45 is determined. Therefore, specially, in the case in which motion images are displayed on a liquid crystal panel as the light modulation device, it is possible to prevent the occurrence of the motion images being displayed with a trail, that is, "trailing phenomenon".

Accordingly, it is possible to provide the image display device 40 having excellent motion image characteristics.

In the third embodiment, the cylindrical lens 43 is used; however, this is not limited, and a lens converting the incident laser light into a parallel light may be used.

Fourth Embodiment

Figure 7:
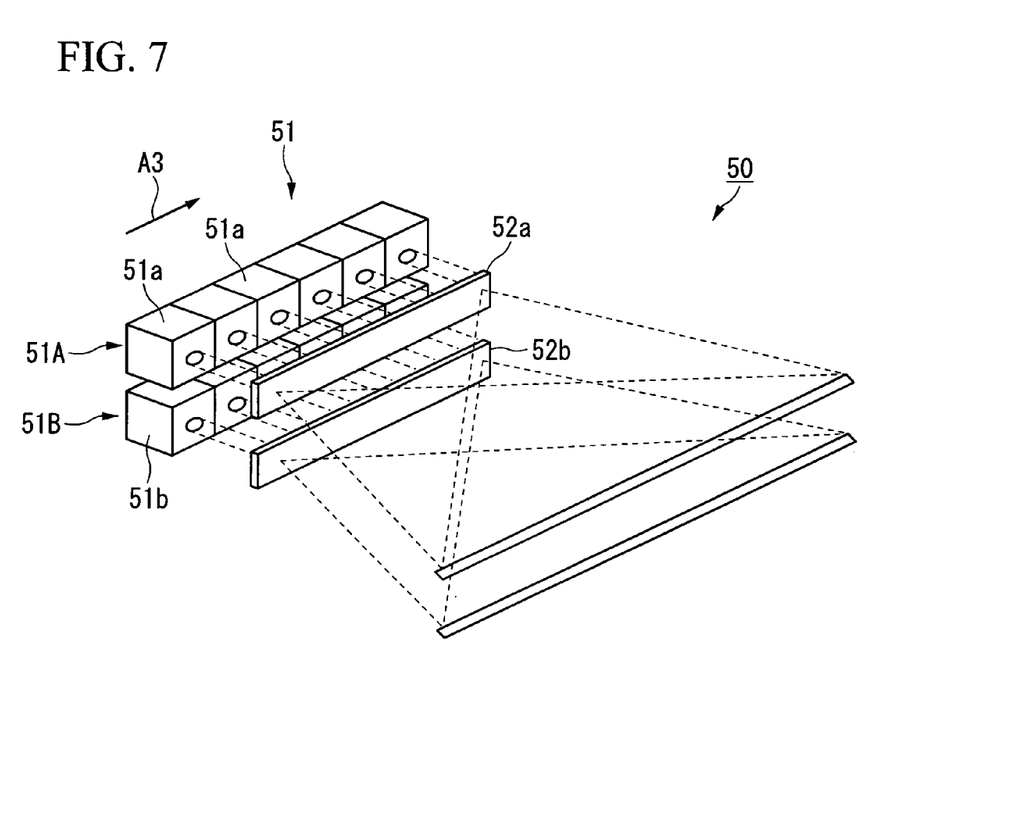
FIG. 7 is a perspective view of an image display device according to a fourth embodiment of the invention.
Figure 8:
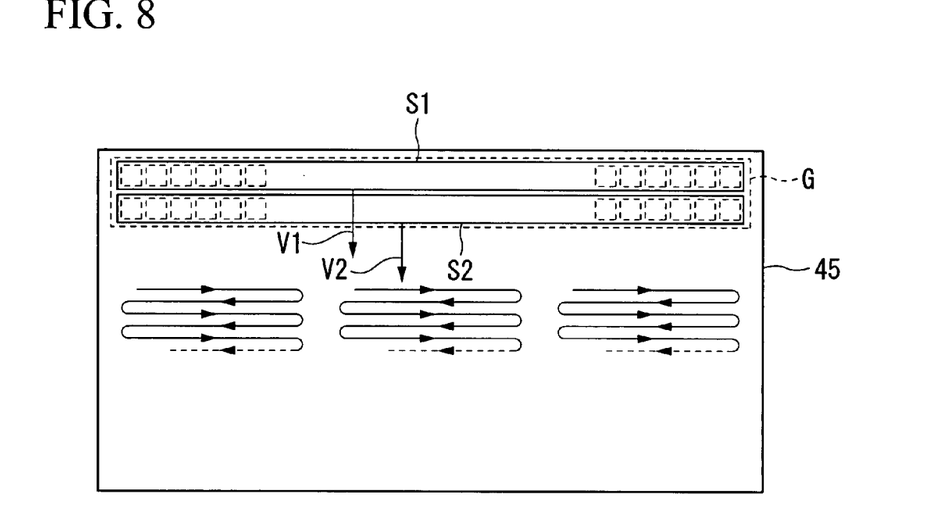
FIG. 8 is a plan view of a light modulation device of the image display device of FIG. 7.

Next, an image display device of a fourth embodiment of the invention is explained, referring to FIGS. 7 and 8.

The image display device 50 of the fourth embodiment is different from the third embodiment in that the laser light source 51 includes a first laser array 51A and a second laser array 51B.

As shown in FIG. 7, the laser light source 51 includes the first laser array 51A (emitting array) and the second laser array 51B (emitting array).

The first laser array 51A includes a plurality of semiconductor laser elements 51a arrayed along an array direction A3.

The second laser array 51B includes a plurality of semiconductor laser elements 51b arrayed along the same direction as the array direction A3 of the semiconductor laser element 51a.

In the laser light source 51, the first laser array 51A and the second laser array 51B are arrayed as two arrays in a direction which is vertical to the array direction A3.

The laser lights emitted from the first laser array 51A are made uniform by a micro lens array (optical element) 52a, and converted into the linear laser light thereby.

Similarly, the laser lights emitted from the second laser array 51B are made uniform by a micro lens array (optical element) 52b, and converted into the linear laser light thereby.

Thus, in the fourth embodiment, the micro lens array 52a and 52b convert the laser lights emitted from the laser light source 51 into the linear laser lights, the number of the linear laser lights is equal to the number of the micro lens arrays (52a and 52b).

In a similar manner as the third embodiment, the scanning mirror 44 scans the laser beam emitted from semiconductor laser elements 51a into the two-dimensional light valve 45, thereby the linear laser light S1 is illuminated onto the area G at which the pixel data of the two-dimensional light valve 45 is determined, and the linear laser light S1 is moved in the direction indicated as reference numeral V1, as shown in FIG. 8.

Similarly, the scanning mirror 44 scans the laser beam emitted from semiconductor laser elements 51b into the two-dimensional light valve 45, thereby the linear laser light S2 is illuminated onto the area G, and the linear laser light S2 is moved in the direction indicated as reference numeral V2.

Next, the driving of the first laser array 51A and the second laser array 51B is explained.

The first laser array 51A and the second laser array 51B are independently drivable.

The linear laser light S1 and the linear laser light S2 are independently illuminated on the two-dimensional light valve 45, respectively, only when the linear laser light S1 and the linear laser light S2 are scanned onto the two-dimensional light valve 45.

Specifically, when the linear laser light S2 emitted from the second laser array 51B is incident into the top side of the two-dimensional light valve 45, the second laser array 51B illuminates.

At this time, since the linear laser light S1 of the first laser array 51A is not on the two-dimensional light valve 45, the first laser array 51A does not illuminate.

Sequentially, when the linear laser light S1 is incident to the two-dimensional light valve 45, the first laser array 51A illuminates.

Furthermore, the linear laser light S1 and the linear laser light S2 are illuminated onto the two-dimensional light valve 45 while maintaining a predetermined distance, and move (scan) in the direction V1 and V2.

In a similar manner in that the linear laser light S1 and S2 are reached at the bottom of the two-dimensional light valve 45, when the linear laser light S2 of the second laser array 51B scans from the bottom of the two-dimensional light valve 45 to the outside of the two-dimensional light valve 45, the second laser array 51B will turn off.

At this time, since the linear laser light S1 of the first laser array 51A remains to be illuminated on the two-dimensional light valve 45, the first laser array 51A illuminates.

Sequentially, when the linear laser light S1 of the first laser array 51A scans from the two-dimensional light valve 45 to the outside of the two-dimensional light valve 45, the first laser array 51A will turn off.

In the image display device 50 of the fourth embodiment, it is possible to obtain the same effects as the image display device 40 of the third embodiment.

Furthermore, in the image display device 50 of the fourth embodiment, since the laser light source 51 includes two arrays that are the first laser array 51A and the second laser array 51B, the linear laser lights S1 and S2 emitted from the laser arrays 51A and 51B, respectively, and are illuminated onto the two-dimensional light valve 45.

Thus, it is unnecessary to add an angle due to bend the incidence angle at which the linear laser lights S1 and S2 are incident to the two-dimensional light valve 45, and it is possible to make the incidence angle small.

In the fourth embodiment, the laser light source 51 including two emitting arrays (the first laser array 51A and the second laser array 51B) is explained. Three or more emitting arrays may be applied.

Fifth Embodiment

Figure 9:
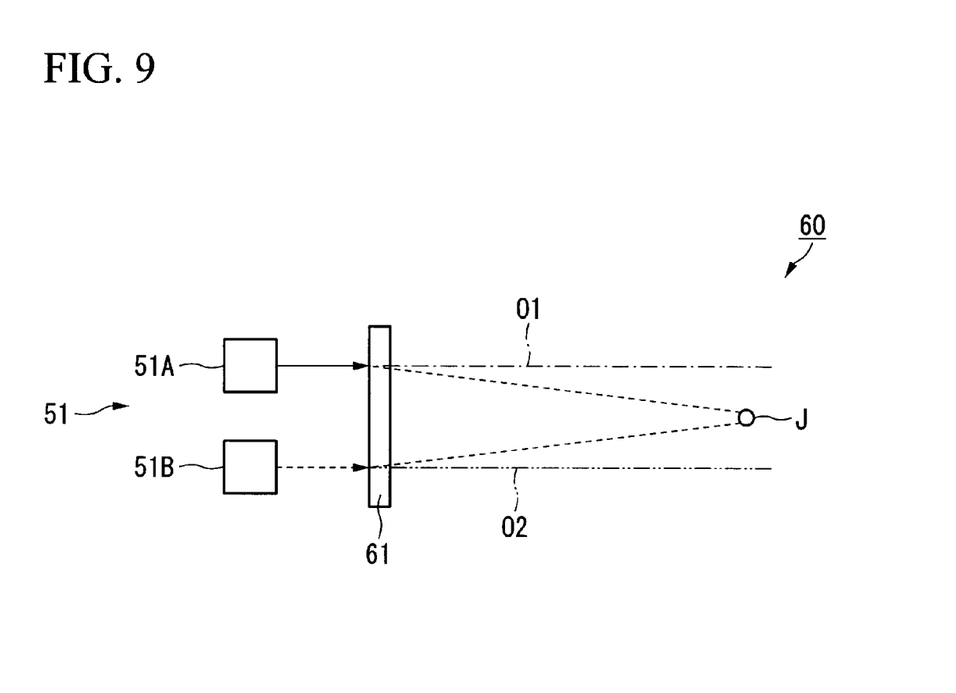
FIG. 9 is a plan view of an image display device according to a fifth embodiment of the invention.

Next, an image display device of a fifth embodiment of the invention is explained, referring to FIG. 9.

The image display device 60 of the fifth embodiment is different from the fourth embodiment in that hologram element 61 is included instead of the micro lens array 52a and 52b.

In the fourth embodiment, the laser lights emitted from the laser arrays 51A and 51B are converted into the linear laser lights whose number is equal to the number of the laser arrays 51A and 51B. In the case in which the one-dimensional light valve described in the second embodiment is used, it is necessary to convert the laser arrays 51A and 51B into one laser light.

An illumination including a plurality of the laser lights emitted at an exceedingly narrow pitch may be used. However, in this case, it is necessary to make the pitch of the laser lights smaller than the pitch of the laser arrays.

Also, it is necessary to illuminate the laser lights emitted from the laser arrays onto a potion other than a portion of the laser arrays.

Therefore, in the fifth embodiment, an image display device 60 is explained, in which a potion other than a portion of the laser arrays is illuminated using a hologram element 61 instead of the micro lens arrays 52a and 52b of the image display device 50 of the fourth embodiment.

The hologram element 61 is an optical element that condenses the laser lights emitted from the first laser array 51A and the second laser array 51B, into one place, converting the laser lights into the linear laser light J.

The hologram element 61 condenses the laser lights emitted from the laser array 51A and 51B between an optical path 01 of the zero-dimensional light of the laser lights emitted from the first laser array 51A and an optical path 02 of the zero-dimensional light of the laser lights emitted from the second laser array 51B.

The image display device 60 of the fifth embodiment in which one linear laser light is made from the two laser lights is desirably applied to make the linear laser light illuminate onto the one-dimensional light valve.

In the image display device 60 of the fifth embodiment, it is possible to obtain the same effects as the image display device 50 of the fourth embodiment.

Furthermore, in the image display device 60 of the fifth embodiment, the hologram element 61 condenses the laser lights emitted from the laser arrays 51A and 51B into a portion other than a portion through which the optical paths 01 and 02 of the zero-dimensional lights of the laser lights pass.

Therefore, since the zero-dimensional light affecting the images is not illuminated onto the light valve, it is possible to clearly project the images onto the screen.

Specifically, since the laser lights emitted from the laser light source 51 are condensed between the optical paths 01 and 02 of the zero-dimensional lights, it is possible to make the incidence angle small, the incidence angle being the angle at which both laser lights emitted from the first laser array 51A and the second laser array 51B.

Sixth Embodiment

Figure 10:
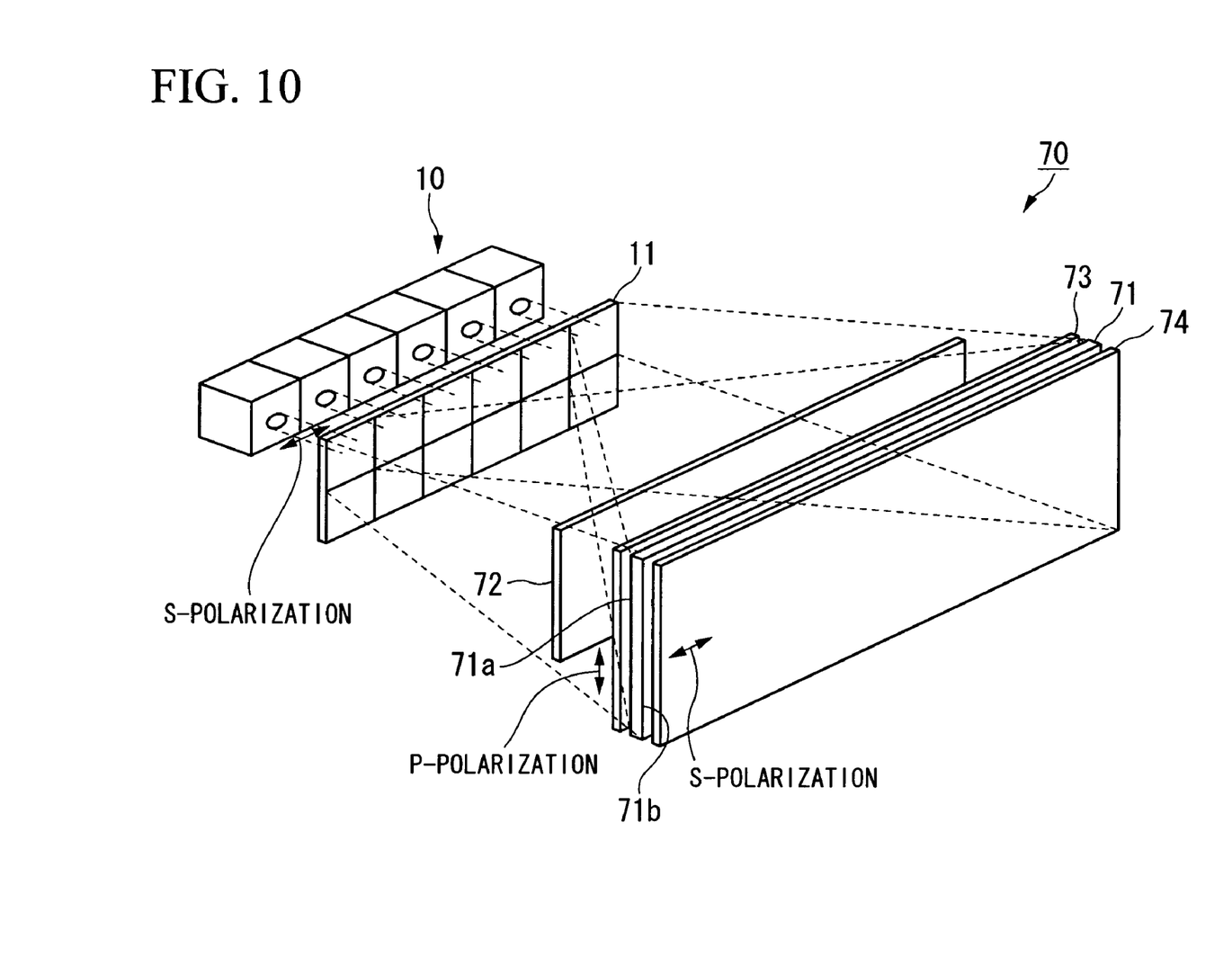
FIG. 10 is a perspective view of an image display device according to a sixth embodiment of the invention.

Next, an image display device of a sixth embodiment of the invention is explained, referring to FIG. 10.

The image display device 70 of the sixth embodiment is different from the first embodiment in that the light modulation device is a liquid crystal light valve (liquid crystal element) 71 and a half wavelength plate (phase difference plate) 72 is disposed between the micro lens array 11 and the liquid crystal light valve 71.

Thus, in the case of illuminating the liquid crystal light valve, it is necessary that the array direction of the semiconductor laser elements coincides with the longitudinal direction of the light valve. Also, it is necessary that the polarization direction of the laser lights coincides with the polarization direction of the incidence lights into light valve.

In the sixth embodiment, in the case in which the array direction of the semiconductor laser elements and the polarization direction of the laser lights emitted from the laser light source are already determined, the array direction of the semiconductor laser elements preferentially coincides with the longitudinal direction of the light valve, and the plane of polarization of the laser lights coincides with the polarization direction of the incidence-side of the light valve due to the half wavelength plate 72.

Specifically, the laser light source 10 emits S-polarized laser lights as shown in FIG. 10.

An incidence-side polarization plate 73 is arranged at the side of the incidence surface 71a of the liquid crystal light valve 71, and an emission-side polarization plate 74 is arranged at the side of the emission surface 71b of the liquid crystal light valve 71.

The incidence-side polarization plate 73 makes P-polarized laser lights incident to the liquid crystal light valve 71. The emission-side polarization plate 74 emits the S-polarized laser lights from the liquid crystal light valve 71.

At this time, P-polarized laser lights have emitted from the laser light source 10 are converted into the S-polarized laser lights by the half wavelength plate 72. The S-polarized laser lights are sequentially incident to the liquid crystal light valve 71 via the incidence-side polarization plate 73.

In the image display device 70 of the sixth embodiment, it is possible to obtain the same effects as the image display device 1 of the first embodiment.

In the sixth embodiment, the image display device 70 is desirably applied when the polarization direction of the laser lights emitted from the light source 10 does not coincide with a polarization direction of the incidence-side polarization plate 73.

Specifically, due to the half wavelength plate 72, since the plane of polarization of the laser lights have emitted from the laser light source 10 is rotated, the polarization direction of the laser light can be coincided with the incidence-side of polarization direction of the liquid crystal light valve 71.

Accordingly, since it is possible to improve the light using efficiency, it is possible to obtain brighter images.

The half wavelength plate 72 may be used as a phase difference plate in the sixth embodiment.

The phase difference plate can be modified according to the polarization direction of the laser light emitted from the laser light source 10 and the polarization direction of the incidence-side polarization plate.

In the case in which both polarization directions can be coincided with each other in a process of packaging the semiconductor laser elements to the laser light source 10, it is preferable that both polarization directions be coincided with each other.

In addition, the technical scope of the invention is not limited to the above embodiments, but various modifications may be made without departing from the spirit and scope of the invention.

For example, as the laser light source, a laser array in which the elements including emitting sections are individually formed, or a light source composed from the laser bar, is used in each embodiment described above. Any one of the light sources may be used as the laser light source.

Figure 11:
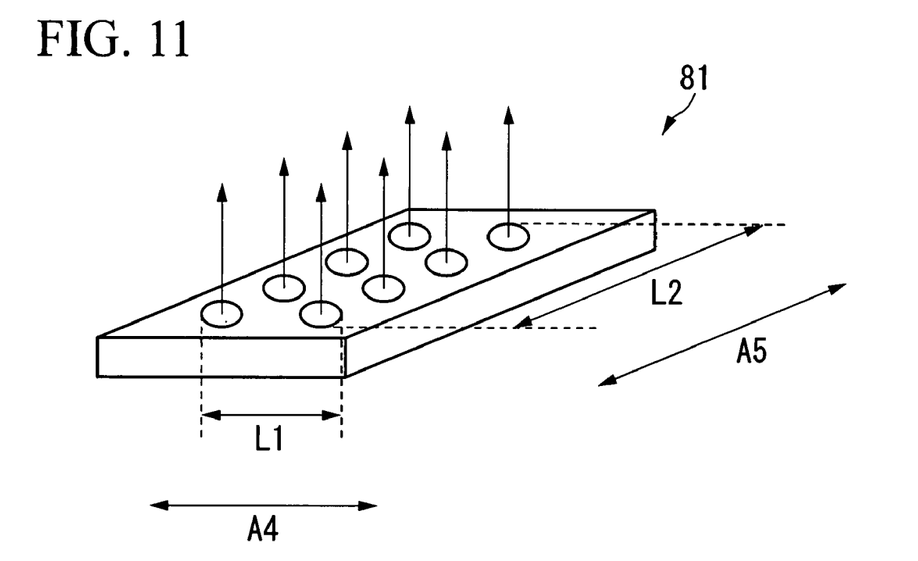
FIG. 11 is a perspective view of a modified example of the laser light source according to each embodiment.

Furthermore, as shown in FIG. 11, a vertical cavity surface emitting laser array 81 including a plurality of the emitting sections may be used as the laser light source.

In the vertical cavity surface emitting laser array 81, the emitting sections are arrayed in an array direction A4 (second direction) as two arrays, and in an array direction A5 (first direction) as four arrays.

In this case, comparing the distance L1 between both ends of the emitting sections arranged in the array direction A4 with the distance L2 between both ends of the emitting sections arranged in the array direction A5, the distance L2 is longer than the distance L1.

Furthermore, the array direction A5 coincides with the longitudinal direction of the illumination region of the light modulation device described above.

In this invention, the predetermined direction in which the emitting sections are arrayed does not relate to the number of the emitting sections or the length of outline of the laser source. The predetermined direction means the array direction in which a distance between both ends of the emitting sections arranged are greater than the other.

In addition, the laser light source may include an integrated optical fiber structure. In this structure, the laser light emitted from the emitting section is incident to each optical fiber, and the laser lights transmitted through the optical fibers are integrated into the laser light source.

In addition, a heat sink may be formed on the above described laser light source. In this structure, the heat sink radiates the heat generated according to the emission of the emitting sections.

Figure 12:
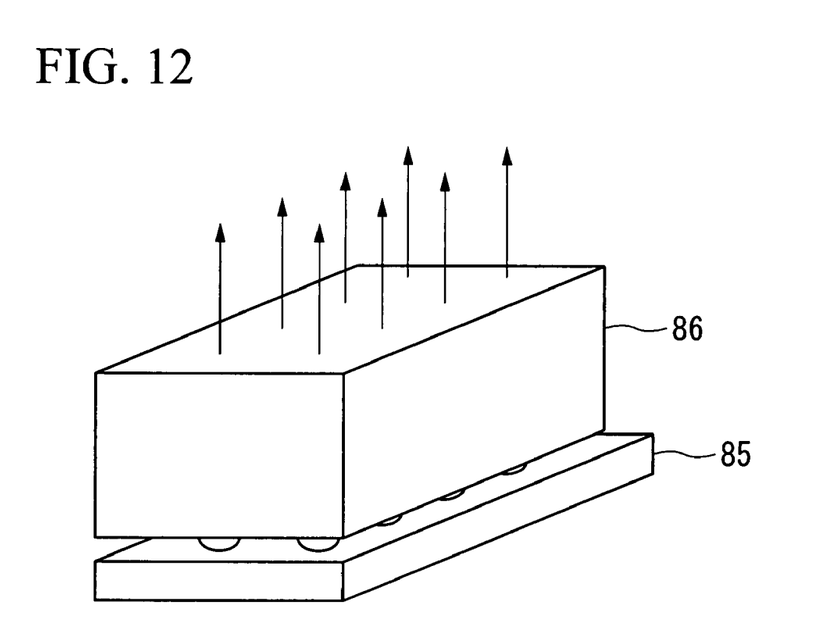
FIG. 12 is a perspective view of a modified example of the laser light source according to each embodiment.

In addition, in the above described embodiments, the laser lights emitted from the emitting sections are visible light. As shown in FIG. 12, a laser light source 85 including emitting sections that emit an infrared light, may be applied.

In this case, due to a wavelength converting element 86 arranged at the posterior of the laser light source 85, the laser lights emitted from the emitting sections are converted into a predetermined wavelength.

Furthermore, in order to improve the efficiency of inverting the wavelength, an external resonator may be arranged at a posterior of the wavelength converting element 86.

What is claimed is:

1. An image display device comprising:
   a laser light source having an emitting array including a plurality of emitting sections arrayed in a predetermined direction;

a light modulation device that is a liquid crystal element, has an illumination region in which a plurality of light modulation pixels are two-dimensionally arrayed and modulates laser lights emitted from the laser light source in accordance with an image signal, the illumination region extending in a longitudinal direction and in a lateral direction;

an optical element converting the laser lights emitted from the laser light source, into a linear laser light; and a scanning section scanning the linear laser light emitted from the optical element onto the light modulation device, wherein the predetermined direction in which the emitting sections are arrayed coincides with the longitudinal direction of the illumination region of the light modulation device, and wherein the light modulation device writes or overwrites pixel data by one pass scan method, and the scanning section scans the linear laser light so that the linear laser light is illuminated onto an area of the illumination region at which a transmissivity of the light modulation pixels has reached a predetermined value.

2. The image display device according to claim 1, wherein the laser light source includes a plurality of emitting arrays that are arranged in a direction orthogonal to the predetermined direction, and wherein the number of the linear laser lights is equal to the number of the emitting arrays.

3. The image display device according to claim 1, further comprising:

a phase difference plate is disposed between the laser light source and the light modulation device.

4. The image display device according to claim 2, wherein the emitting arrays are independently drivable.

5. The image display device according to claim 1, further comprising:

a lens converting the linear laser light emitted from the optical element into parallel light and emitting the parallel light toward the scanning section.

6. The image display device according to claim 1, wherein the time at which the transmissivity of the light modulation pixel reaches the predetermined value is after the time at which the predetermined voltage is supplied to the light modulation pixel.

* * * * *